(12) United States Patent
Mo (10) Patent No.: US 8,296,280 B2
(45) Date of Patent: Oct. 23, 2012

(54) IMAGE-BASED SEARCH SYSTEM AND METHOD

(75) Inventor: Yeong Il Mo, Seoul (KR)

(73) Assignee: G & G Commerce Ltd., Seoul (KR)

( * ) Notice: Subject to any disclaimer, the term of this patent is extended or adjusted under 35 U.S.C. 154(b) by 635 days.

(21) Appl. No.: 12/135,667

(22) Filed: Jun. 9, 2008

(65) Prior Publication Data

US 2009/0112862 A1 Apr. 30, 2009

(30) Foreign Application Priority Data

Oct. 26, 2007 (KR) .................. 10-2007-0108065

(51) Int. Cl.
*G06F 7/00* (2006.01)
*G06F 17/30* (2006.01)

(52) U.S. Cl. .................. 707/706; 707/741; 707/915
(58) Field of Classification Search .................. 707/705, 707/706, 709, 707, 736, 741, 758, 769, 772, 707/780, 913, 915, 999.002, 999.003, 999.107
See application file for complete search history.

(56) References Cited

U.S. PATENT DOCUMENTS

| | | | |
|---|---|---|---|
| 6,408,301 B1 * | 6/2002 | Patton et al. | 707/741 |
| 7,010,144 B1 * | 3/2006 | Davis et al. | 382/100 |
| 7,058,628 B1 * | 6/2006 | Page | 707/5 |
| 7,739,221 B2 * | 6/2010 | Lawler et al. | 707/711 |
| 2002/0107718 A1 * | 8/2002 | Morrill et al. | 705/10 |
| 2002/0165801 A1 * | 11/2002 | Stern et al. | 705/27 |
| 2003/0123701 A1 * | 7/2003 | Dorrell et al. | 382/100 |
| 2003/0195883 A1 * | 10/2003 | Mojsilovic et al. | 707/6 |
| 2005/0044100 A1 * | 2/2005 | Hooper et al. | 707/102 |
| 2006/0169772 A1 * | 8/2006 | Page et al. | 235/383 |
| 2007/0043583 A1 * | 2/2007 | Davulcu et al. | 705/1 |
| 2007/0294240 A1 * | 12/2007 | Steele et al. | 707/5 |
| 2008/0010263 A1 * | 1/2008 | Morton | 707/4 |

FOREIGN PATENT DOCUMENTS

| | | | |
|---|---|---|---|
| KR | 1020000058721 A | | 10/2000 |
| KR | 1020000072125 A | | 12/2000 |
| KR | 1020030023892 A | | 3/2003 |
| KR | 1020060122791 A | | 11/2006 |
| KR | 1020070009174 A | | 1/2007 |
| KR | 100687906 B1 | | 2/2007 |
| KR | 100687906 B1 | * | 2/2007 |
| KR | 1020070073247 A | | 7/2007 |

* cited by examiner

*Primary Examiner* — Marc Somers
(74) *Attorney, Agent, or Firm* — Edwards Wildman Palmer LLP (57) ABSTRACT

Disclosed-herein is an image-based search system and method. The image-based search system includes at least one user terminal, an information communication network, a search server, and a web server. The user terminal transmits any one or more of a search term entry signal, an image selection signal and an image combination signal to a search server and receives relevant search results from the search server. The information communication network connects the user terminal, the search server and a web server to one another. The search server receives any one or more of the search term entry signal, the image selection signal and the image combination signal from the user terminal, performs searching using attribute information of an image, and transmits search results, including images, to the user terminal. The web server forms a physical space over the information communication network, in which websites, which are objects from which information is gathered by the search server, exist.

23 Claims, 7 Drawing Sheets

IMAGE-BASED SEARCH SYSTEM AND METHOD

BACKGROUND OF THE INVENTION

1. Field of the Invention

The present invention relates to an image-based search system and method, and, more particularly, to an image-based search system and method, which acquire the attribute information of images in advance, thereby enabling accurate and detailed information searching using various types of attribute information, such as one or more keywords, which are included in one or more images, when the images are selected and thereby enabling a user to directly construct desired search information in image form and to perform information searching using the attribute information acquired from the constructed image, and which, in particular, encode the attribute information of images in specific space within image information, thereby considering the efficiency with which searching is performed and thereby providing link information, pattern information or color information along with an image, in order to solve the problems of conventional information search methods of obtaining simple search results through the entry of simple text.

2. Description of the Related Art

Typical searching in a typical search site is performed in such a way that a user enters desired search text in a search term box and then relevant result information is returned. Here, the result information generally includes not only search results in text form but also search results in image form, which are previously registered by other image registrants.

Figure 1A:
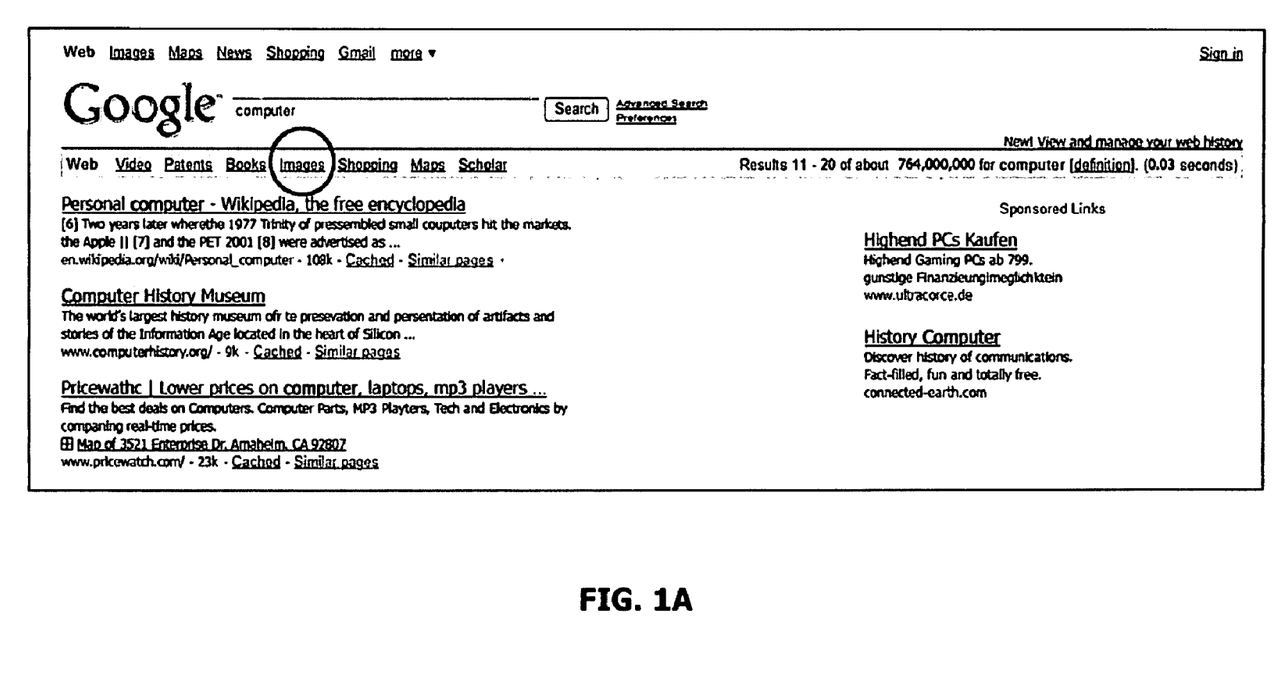
FIG. 1A is a screen showing search results that are obtained by performing searching in such a way as to enter a search term in Google®.

For example, search results, obtained by entering the word 'computer' in a search term box in the search site Google®, are shown in FIG. 1A.

Figure 1B:
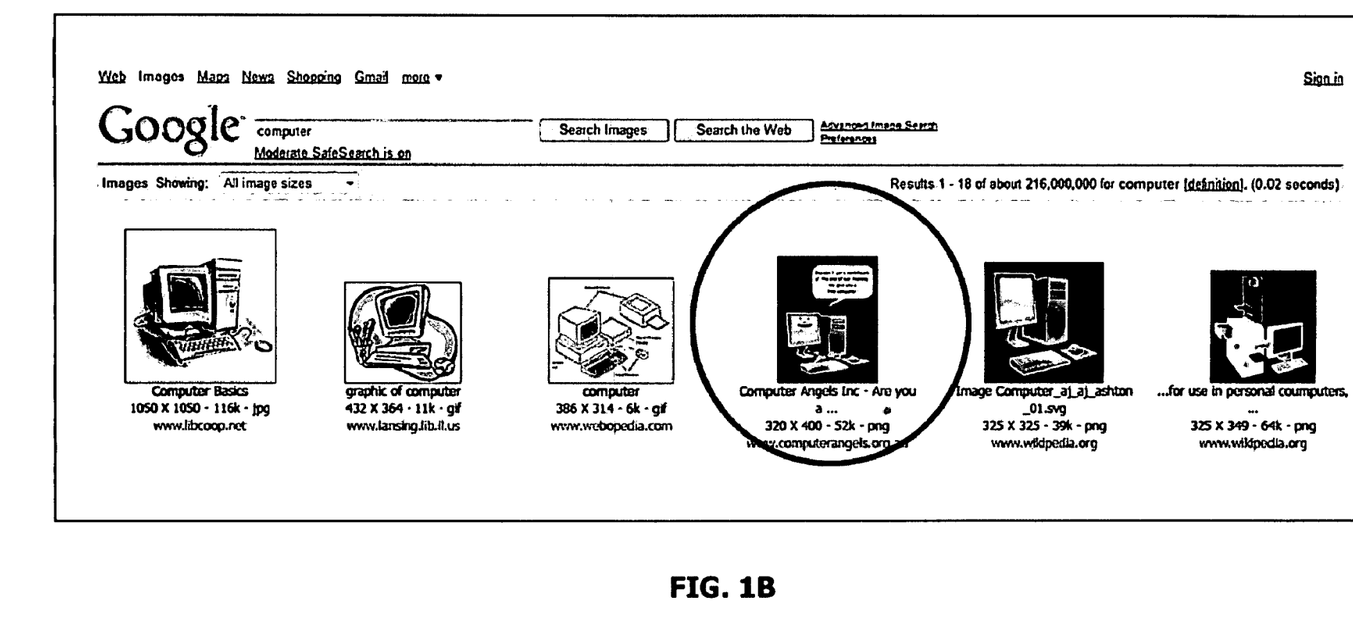
FIG. 1B is a screen showing results that are obtained by clicking on the image section of FIG. 1A.

In FIG. 1A, when an image section is clicked on, various images are found, as shown in FIG. 1B. The found images are images that include the word 'computer' in their image file names.

Figure 1C:
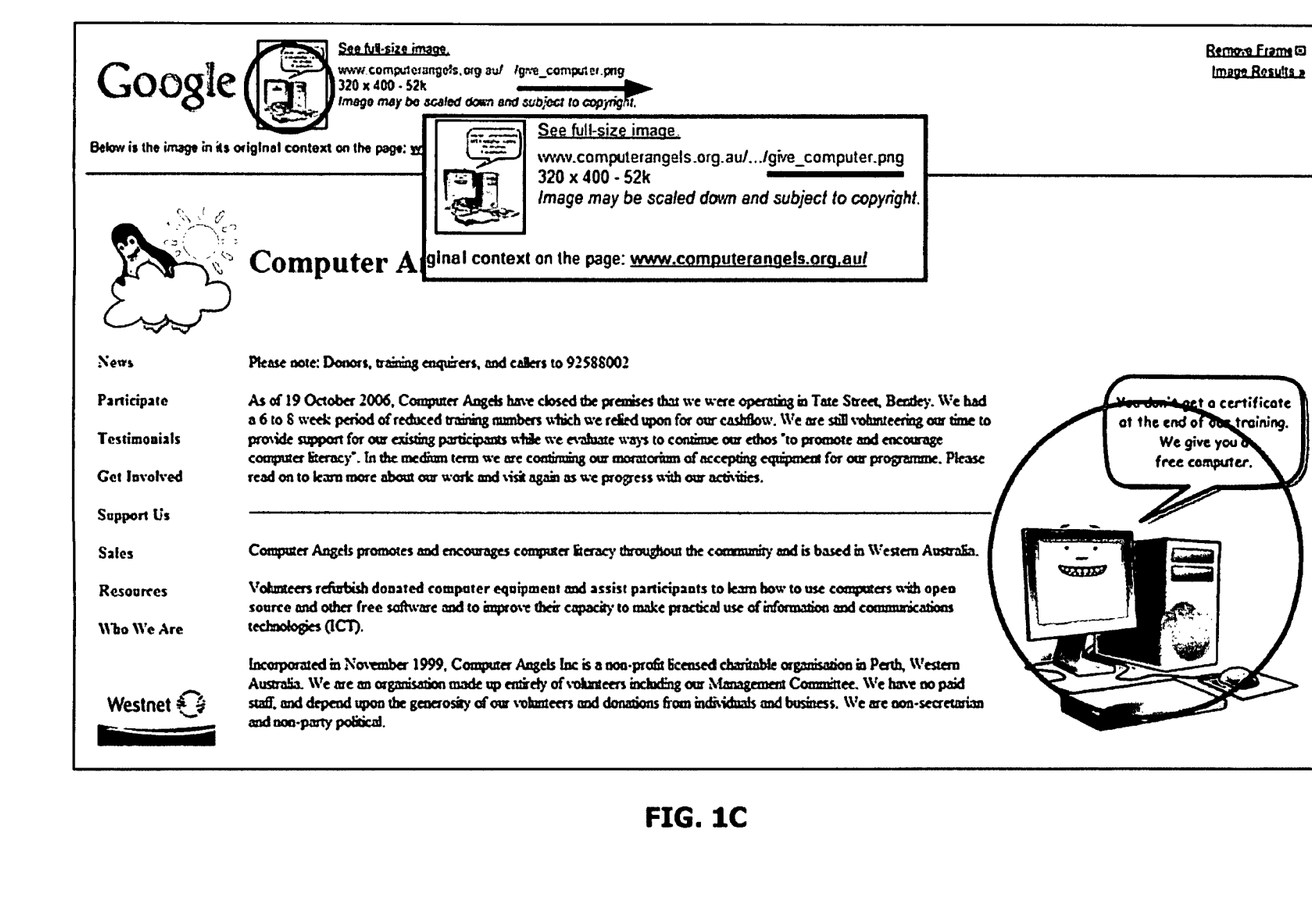
FIG. 1C is a screen showing results that are obtained by clicking on one of the images of FIG. 1B.

When one of the images shown in FIG. 1B is clicked on, an original Hyper Text Markup Language (HTML) file including the relevant image is found. That is, when an image indicated by a red circle in FIG. 1B is clicked on, a search result, such as that shown in FIG. 1C, is displayed. As shown in FIG. 1C, the name of a found image file is 'give computer.png', and an image on the right bottom of FIG. 1C is gathered and stored by a search engine and then displayed on the search screen of FIG. 1B at the request for searching by a user.

Another search site, that is, Naver®, provides image search results that exist in HTML files in which an entered search term is included in text form. When a found image is clicked on, the page of a photo album, an Internet café, a blog or the like, in which the clicked image is included, is provided.

However, although the above-described search sites provide relevant images in response to the input of each search term, users generally perform each searching using only one or two search terms, and search results provide only web pages including relevant images, and thus it is difficult to find desired information.

Furthermore, when it is difficult to describe a search object using a word, an appropriate word does not come into one's mind, or the entire attribute information related to a search object is not recalled and entered, desired search results cannot be obtained.

Furthermore, when images relevant to entered text are primarily found and one of the found images or a combination of two or more found images is selected, it is impossible to obtain search results based on unique attribute information related to each image, and it is also impossible to perform searching using an image instead of text.

For example, it may be assumed that a user attempts to search for the following TV:
Product name: TV
Use: household
Location: wall mount type
Screen characteristic: LCD
Color: black
Brand: Samsung
Appearance: rounded edges
Size: 30 inches
. . .

In order to obtain accurate search results for the TV having the above-described features through the conventional search sites, a search term, such as 'household 30-inch black wall mount-type LCD TV having rounded edges by Samsung® . . . 'must be entered in text form. Otherwise, time and/or effort is inevitably consumed through repetitive text searching within results.

The reason why it is impossible to perform detailed information searching using images in the conventional search engines is that the conventional search engines store only image files, file names, the URLs of web pages (that is, sources), and/or text, existing in relevant web pages, in their image data management databases. Accordingly, it is impossible to perform additional searching using text information stored in image data management databases.

In particular, no attempt has been made to perform information searching through image simulation, which uses attribute values, which are obtained from silhouette information, pattern information and color information, produced during a process in which a user directly creates an image to search for desired information or during a process in which a user assembles provided detailed images and changes the pattern or color of the image, as search terms.

SUMMARY OF THE INVENTION

The present invention has been made keeping in mind the above problems occurring in the prior art, and an object of the present invention is to provide accurate search results, desired by a user, in such a way as to enable the user to select an image, including attribute information, such as various keywords, in order to overcome difficulty in obtaining search results through the entry of simple text.

The present invention has been made keeping in mind the above problems occurring in the prior art, and another object of the present invention is to improve the efficiency of the management of images and enable a user himself or herself to create images, including various pieces of attribute information, through a simulation capable of directly creating images, in such a way as to separately store the attribute information of images in a database and encode attribute information in an image.

The present invention has been made keeping in mind the above problems occurring in the prior art, and a further object of the present invention is to prevent a search server from encoding additional information in images in such a way as to encode and store attribute information, such as relevant keywords, in images when other users register products or the images over the Internet.

The present invention has been made keeping in mind the above problems occurring in the prior art, and yet another object of the present invention is to enable a user to conveniently obtain image-related information simply in such a way as to also provide link information, pattern information or color information when providing found images to the user.

The present invention has been made keeping in mind the above problems occurring in the prior art, and still another object of the present invention is to enable a user to simply search for desired products based on accurate image search results and to conveniently compare the prices of the products with one another.

In order to accomplish the above objects, the present invention provides an image-based search system, including at least one user terminal for transmitting any one or more of a search term entry, an image selection and an image combination to a search server and receiving relevant search results from the search server; an information communication network for connecting the user terminal, the search server and a web server to one another; the search server for receiving any one or more of the search term entry, the image selection and the image combination from the user terminal, performing searching using attribute information of an image, and transmitting search results, including images, to the user terminal; and the web server for forming a physical space over the information communication network, in which websites, which are objects from which information is gathered by the search server, exist.

Preferably, the user terminal is any one of a personal computer, a Personal Digital Assistant (PDA) and a mobile phone.

Preferably, the user terminal includes a function of displaying attribute information of a selected or combined image and a function of modifying or adding attribute information.

Preferably, the search server includes a function of performing searching based on image simulation when the search server or the web server receives an image simulation, requesting searching using attribute information of an image, which is obtained through the image simulation, the image being directly created, assembled or processed by a user through the image simulation, the image simulation being provided to the user terminal through the search server or the web server.

Preferably, the search server includes a function of displaying a multi-recommendation to the user terminal with respect to one or more of clothes images based on the image simulation when the image simulation is related to a clothes image.

Preferably, the search server or the web server includes a function of encoding attribute information, including processed information, in the image, obtained from the image simulation, using an encoding function included in the image simulation itself.

Preferably, the search server or the web server includes a function of recording the attribute information of the image into the image obtained from the image simulation, and, when the image is used in image simulation again, displaying processed information in the image simulation on the user terminal again based on the recorded attribute information.

Preferably, the search server includes a function of, when a found image is an image of a product, providing price comparison information of the product in search results.

Preferably, the search server includes a function of transmitting a received search term to an additional search engine, receiving search results, including images found by the search engine, and providing the search results to the user terminal.

Preferably, the web server includes a function of receiving an image, registered by an image registrant, in order to provide the image to the search server, and encoding and stored attribute information of the image in the registered image.

Preferably, the search server includes an image gathering unit for accessing a number of websites, providing images, at regular intervals and gathering images from the web server; a search Database(DB) for storing search information, including the images gathered by the image gathering unit; and an information search unit for searching the search DB for search information, including the images, and displaying the search results on the user terminal.

Preferably, the image gathering unit includes an attribute information reception unit for receiving attribute information of the gathered images; an encoding unit for encoding the received attribute information of the images in image files; and a decoding unit for decoding the encoded attribute information.

Preferably, the attribute information encoded by the encoding unit includes meta information in HTML pages.

Preferably, when a received image is an image of a product registered with an on-line shopping mall, the attribute information encoded by the encoding unit includes any one or more of a product name and a keyword of the product.

Preferably, when a received image is a still image of a moving image, the attribute information encoded by the encoding unit includes any one or more of a moving image title and a keyword of the moving image.

Preferably, the attribute information encoded by the encoding unit includes link information of a website from which an image is received.

Preferably, when the encoded image is an image obtained through image simulation, the encoding unit includes a function of encoding attribute information including processed information.

Preferably, the encoding unit includes a function of assigning a unique identification (ID) to each piece of processed information.

Preferably, the encoding unit includes a function of inserting an encoding command into an image file so that whether to perform encoding can be determined.

Preferably, the information search unit includes a color extraction unit for extracting color (RGB) values of an image.

Preferably, the color extraction unit includes a function of obtaining a color name relevant to the extracted color (RGB) values and storing or using the color name as attribute information, in order to use the color name as a search term.

Preferably, the information search unit includes a dictionary creation unit for creating a dictionary for indexing.

Preferably, the information search unit includes a function of providing pattern information specified based on the determination of the subject area information or background area information of an image.

Preferably, a sub-area of an area labeled as an open-space area adjoining an outer boundary line of the entire image is determined to be a background area.

Preferably, a boundary line is extracted from the subject area or the background area using a Sobel or Robert mask technique, and pieces of discontinuous data of the extracted boundary line are connected using differential equations.

Preferably, the information search unit further includes a function of providing color information of an image.

Preferably, the color information of the image is obtained by analyzing a main component of color in a closed-space area of the pattern information.

In order to accomplish the above objects, the present invention provides an image-based search method, including (a) gathering search object images; (b) determining whether the gathered search object images include attribute information; (c) if, as a result of the determination at the (b), the gathered search object images include the attribute information, performing image decoding; (d) storing the search object images and the attribute information; and (e) receiving a search request, performing searching in conformity with the search request, and then outputting search results.

Preferably, the (d) comprises (d-1) indexing the attribute information in order to facilitate searching.

Preferably, the image-based search method further includes, after the (b), (c-1) if, as a result of the determination at the (b), the search object images do not include the attribute information, determining whether a HTML meta tag exists in the search object images; and (c-2) if, as a result of the determination at the (c-1), the HTML meta tag exists in the search object images, performing image encoding and returning to the (d).

Preferably, the image-based search method further includes, after the step (c-1), (c-3) if, as a result of the determination at the (c-1), the HTML meta tag does not exist in the search object images, performing image file name encoding and returning to the (d).

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Prior to a description of detailed content for the implementation of the present invention, it is noted that constructions, which are not directly related to the technical gist of the present invention, will be omitted as long as the omission does not make the technical gist of the present invention obscure, and program source code, which can be easily implemented by those skilled in the art, will be omitted also.

Furthermore, terms or words, used in the specification and the claims, should be considered to have meanings and concepts that comply with the technical spirit of the present invention based on the principle by which an inventor can appropriately define the concepts of the terms or words in order to describe the invention in the best way.

The construction of an image-based search system according to a preferred embodiment of the present invention will be described with reference to FIGS. 2 to 5 below.

Figure 2:
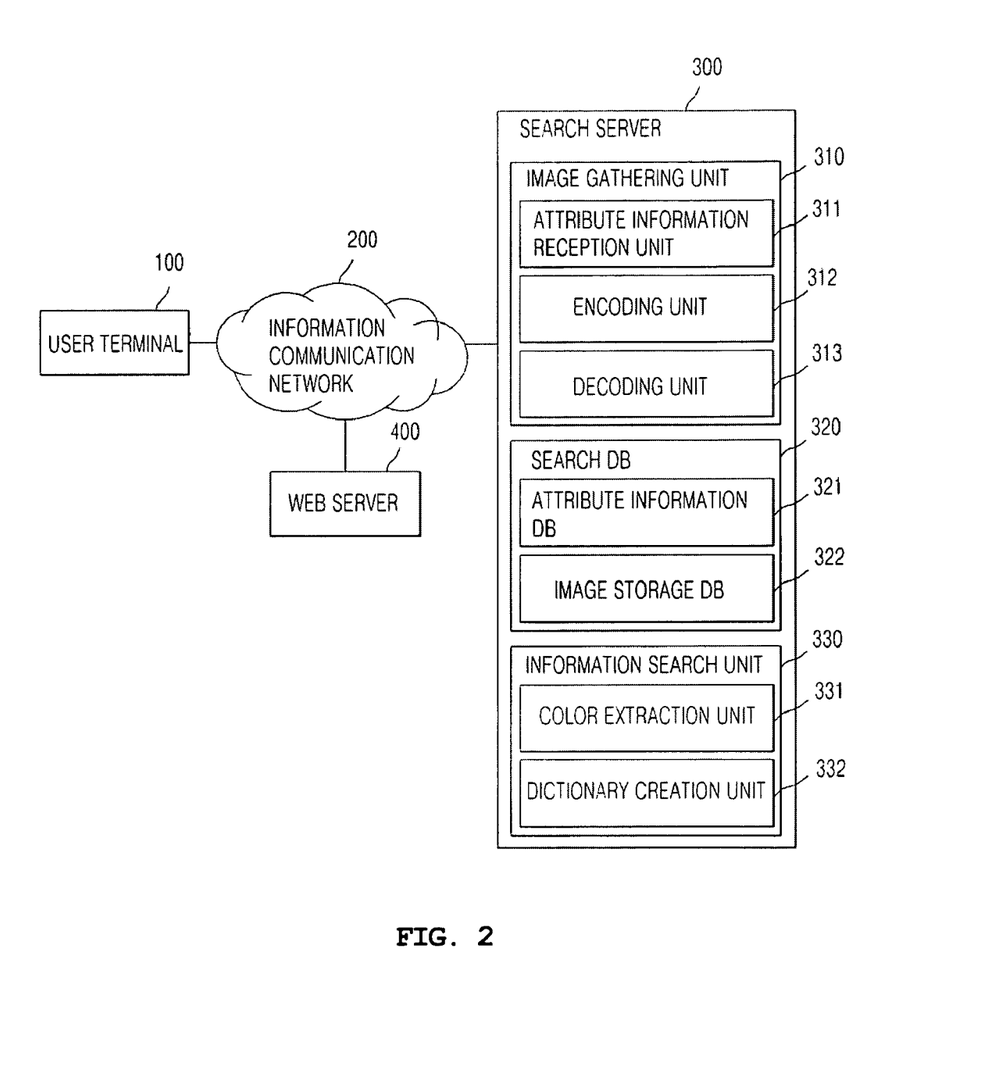
FIG. 2 is a diagram showing the overall construction of an image-based search system according to a preferred embodiment of the present invention.
Figure 3:
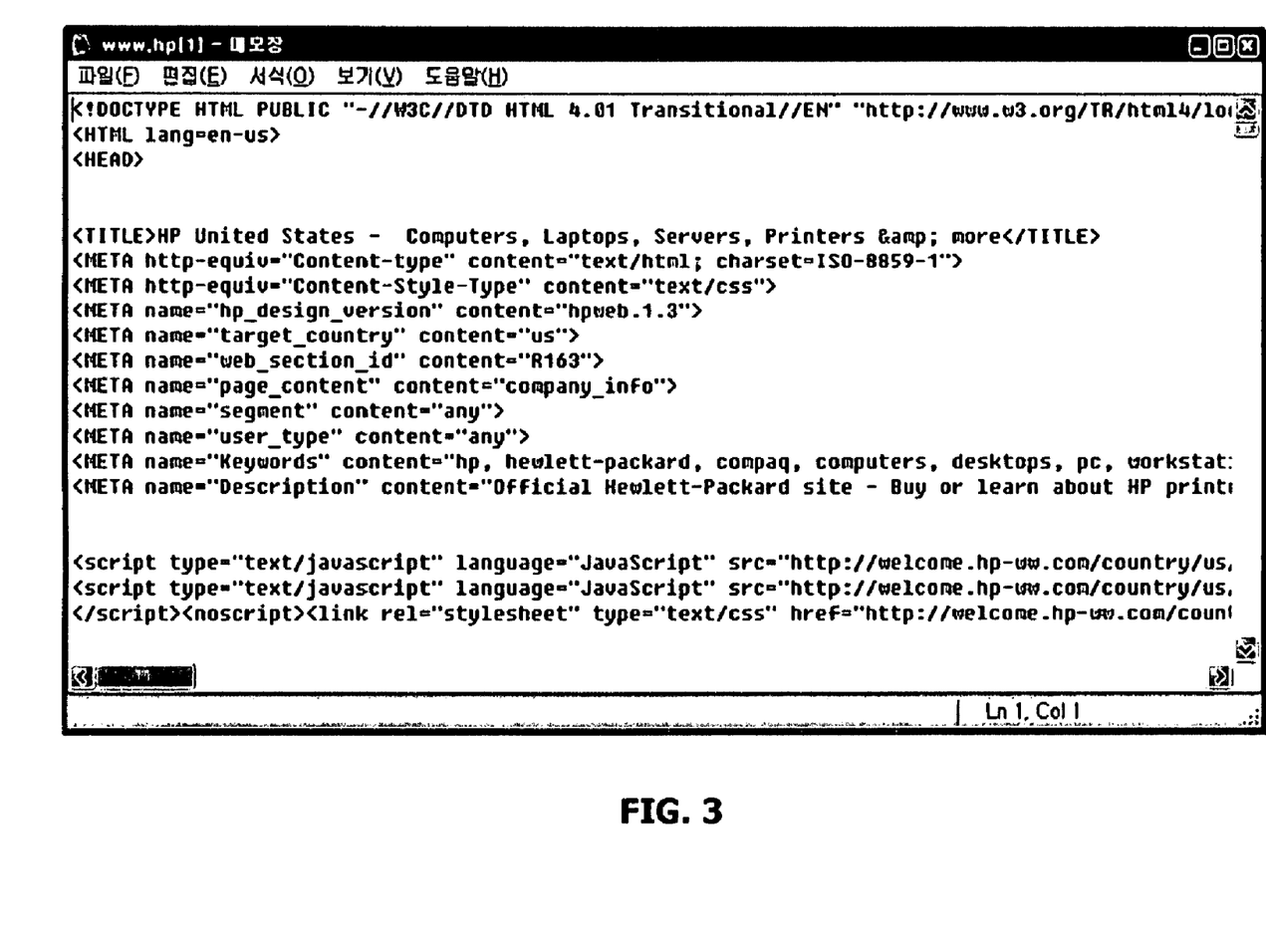
FIG. 3 is a diagram showing an example of various pieces of Meta information in a web page.

FIG. 2 is a diagram showing the overall construction of an image-based search system according to a preferred embodiment of the present invention. FIG. 3 is a diagram showing an example of various pieces of Meta information in a web page.

Figure 4:
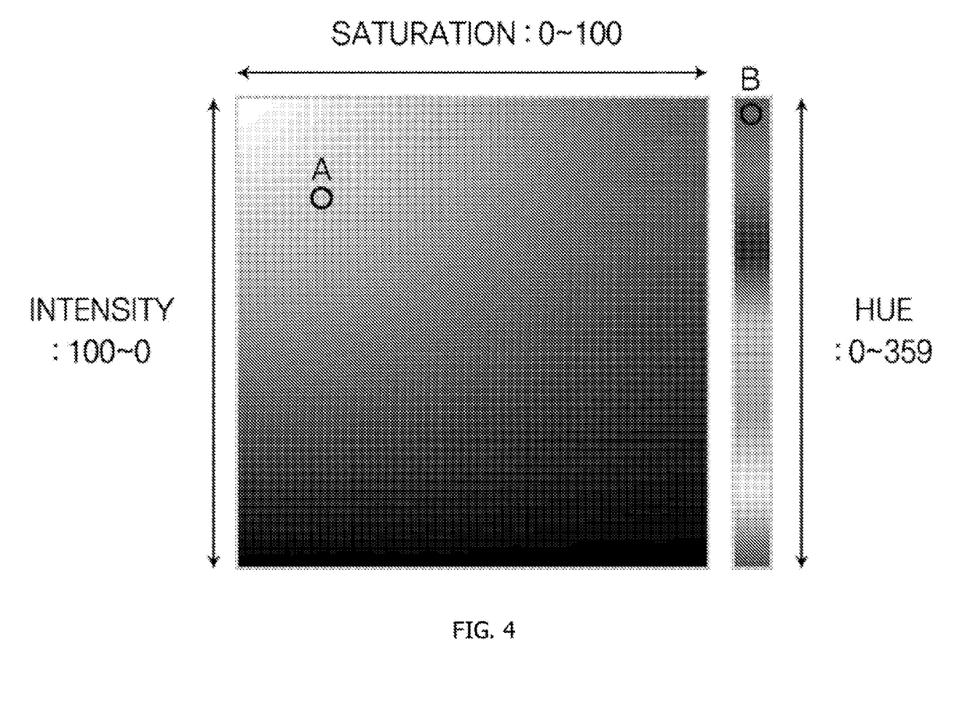
FIG. 4 is a view showing an example of the distribution of colors for a pattern.
Figure 5:
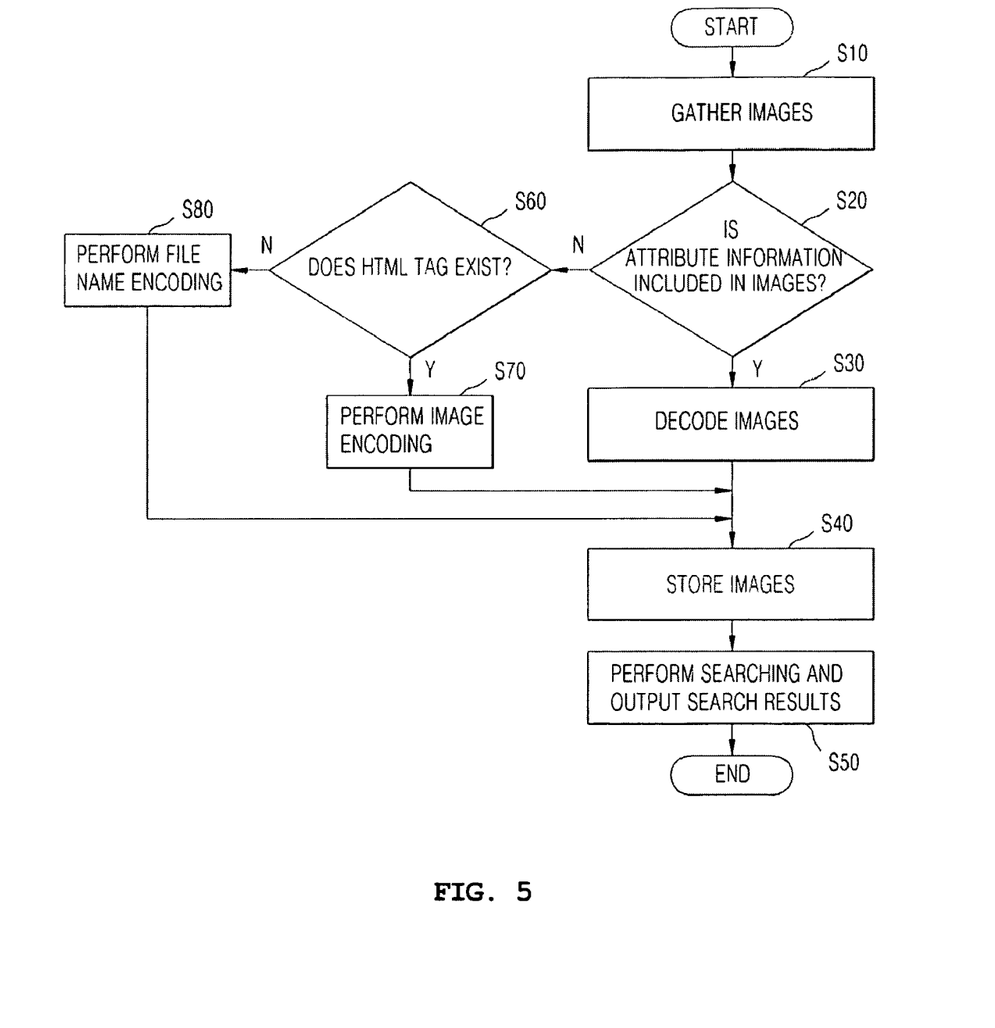
FIG. 5 is a flowchart showing the overall flow of an image-based search method according to a preferred embodiment of the present invention.

FIG. 4 is a schematic view showing a color picker in the case of a general graphic tool. FIG. 5 is a view showing an example of the distribution of colors for a pattern.

As shown in FIG. 2, the image-based search system according to a preferred embodiment of the present invention includes a user terminal 100, an information communication network 200, a search server 300, and a web server 400.

The user terminal 100 transmits a search term entry, an image selection, an image combination or an image simulation to the search server 300 over the information communication network 200, and receives search results from the search server 300.

The user terminal 100 has an Internet browser (for example, Netscape®, or Internet Explorer®) capable of displaying web content in HTML form, and may include a personal computer, a Personal Digital Assistant (PDA) and a mobile phone capable of displaying web pages.

The user terminal 100 can perform information searching through the entry of a search term and information searching through the selection of an image or the combination of images.

Meanwhile, when it is impossible to perform searching using a search term due to a user's poor memory or difficulty in describing a search object, or when a user directly creates a desired search object in image form, the user terminal 100 can perform searching through image simulation.

The information searching through the entry of a search term refers to searching that is performed in such a way that the user terminal 100 transmits a search term in text form to the search server 300, receives not only general search results but also search results, including images, for the transmitted search term from the search server 300, and displays the search results.

The information searching through the selection of an image refers to searching that is performed using any one image of general search results, which are received by and displayed on the user terminal 100 as a result of the information searching through the entry of a search term, as a search keyword.

The information searching through the combination of images refers to searching that is performed using a detailed search term that is obtained by selecting one or more images from among general search results, which are received by and displayed on the user terminal 100 as a result of the information searching through the entry of a search term, and combining the two or more selected images.

The searching through the selection of multiple images can obtain more accurate search results because it can obtain a search term, including more pieces of attribute information than when one image is used, through the combination of two or more images. For example, when searching using a combination of a TV image, including the keyword 'TV', and a computer image, including the keyword 'computer' is performed, search results can be related to a combined TV and computer.

The information searching through image simulation refers to searching that is performed using image attribute information that is obtained when a user directly creates, assembles or processes images using the user terminal 100 through image simulation provided by the web server 400 or the search server 300.

For example, in the case of image simulation related to clothes, a user may, through image simulation using the user terminal 100, create a new image by selecting a silhouette of displayed clothes or selecting and assembling detailed images constituting respective parts of the silhouette, and changing the pattern or color of the clothes, and use the new image as a search term. A more detailed image can be created by including a brand logo or inputting size information.

Although, in the present embodiment, a selection is set for the pattern, color, brand or size of clothes, the present invention is not limited thereto.

Furthermore, it is preferred that the user terminal 100 include a function of displaying a relevant keyword when a user selects an image and a function of modifying and adding a search term, in connection with the selection of an image, the combination of images or image simulation.

Additionally, when image search results based on the entry of a search term, the selection of an image, the combination of images or image simulation are provided, the user terminal 100 preferably provides link information together with image information. Using the link information, a user can conveniently move to a web page, linked to a provided image, by clicking on the specific area or a random area of the image.

In general, meta tags for images are standardized using standard methods, including the Exchangeable image file format (EXIF), the International Press Telecommunication Council (IPTC) format and the eXpanded Multiplayer (XMP) format, so that they can be applied to various file characteristics or forms of images. Each meta tag method is used to insert image-related information using memory available from the viewpoint of the structure of image data through an image creation service provider or image provision software. Using such a meta tag method, link information can be provided to the user terminal 100 along with image information when search results including images are provided to the user terminal 100.

Furthermore, the information communication network 200 functions to connect the user terminal 100, the search server 300 and the web server 400 to one another.

The information communication network 200 includes the wired Internet based on the Transmission Control Protocol and Internet Protocol (TCP/IP) and the wireless Internet based on the Wireless Application Protocol (WAP).

Furthermore, the search server 300 perform searching for relevant information in response to a search term entry, an image selection, an image combination or an image simulation from the user terminal 100 over the information communication network 200. The search server 300 includes an image gathering unit 310, a search DB 320, and an information search unit 330.

The image gathering unit 310 gathers images from the web server 400 at regular intervals, and includes an attribute information reception unit 311, an encoding unit 312, and a decoding unit 313.

The attribute information reception unit 311 receives the attribute information of gathered images.

For example, when a gathered image is a detailed product information page, attribute information can be described using meta tags in an HTML page. By registering attribute information, such as the name of a relevant site, the name of a relevant product, a plurality of keywords, specifications, a brand and price, in the meta information of the detailed product information page, the attribute information reception unit 311 can receive the attribute information.

The specific method of receiving attribute information is as follows:

a. When images, registered with Internet cafes, blogs, message boards, or photo albums, are gathered, the attribute information of the relevant images are received in keyword form.

b. When product images, registered with on-line shopping malls, such as Ebay®, are gathered, attribute information, such as the names or prices of relevant products, is received in keyword form.

c. When moving images, registered with Internet cafes, blogs, message boards and photo albums, are gathered, attribute information is received in keyword form.

d. When images are created, assembled or processed through image simulation, attribute information, which can be acquired from each element of a simulated image, is received.

Next, the encoding unit 312 encodes the attribute information of gathered images. The image encoding may be performed in such a way as to encrypt and compress text information, and insert the encrypted and compressed text information into a relevant image in meta tag form, thereby storing the relevant attribute information in image data.

In this case, detailed attribute information may be constructed by directly entering additional tags into the image, other than received attribute information.

In greater detail, when attribute information is not included in a gathered image, the encoding unit 312 determines whether an HTML meta tag exists in a relevant web page, and, if, as a result of the determination, the HTML meta tag exists in the relevant web page, stores text in meta tag form in an image file and encodes the image file. An example of various types of meta information in a web page is shown in FIG. 3. This text is used for encoding.

When an image does not include an HTML meta tag, a file name and a site URL are encoded.

When images are created, assembled or processed through image simulation, the encoding unit 312 contained in the simulation encodes processed information.

For example, when a selection related to the external shape of an electronic product, the silhouette of clothes or an icon is received from the user terminal 100, an image, in which one or more figures, one or more lines and/or text are combined together, can be created. A changed pattern or color may be applied to the created image. Furthermore, the entry of a brand logo and the selection of a size may be performed. The processing information of the created image, that is, information about a pattern or a color, may be extracted.

Unique IDs are assigned to respective pieces of extracted information and the IDs of respective pieces of information selected, created or processed through image simulation are stored, so that the respective pieces of information can be reproduced when necessary.

When information related to moving images registered with Internet cafes, blogs, message boards or photo albums is gathered, captured screens of some of the content of the registered moving images are encoded and stored along with tags of the relevant moving images.

It is preferable that encoding be standardized. Those skilled in the art can store related text information in images based on the IPTC image meta tag standard, established by the IPTC, or the EXIF tag standard, introduced by the Japanese Industrial Standards (JIS). An example thereof is as follows:

// In the Personal Hypertext Preprocessor (PHP) environment, meta information is entered into an image.

Include_once 'ImageMeta.inc';

$imgfile='image.'.preg_replace('@^.*/@',", $img→getMime ( ))";

$img→meta['Description']=iconv('UTF-8', 'CP949', "image attribute information");

$img→setMetaData($imgfile);

Furthermore, it is preferred that, when attribute information is encoded in an image, the encoding unit 312 encodes an encoding command together with the attribute information at the same time, so that whether to perform encoding again can be easily determined.

When attribute information is encoded in an image as described above, the search DB 320 can be easily established through the gathering of images. Even when an image loses its link or has a deformed shape, the entity of the image can be detected because attribute information is included in the image without change.

In particular, in the case of the creation, assembly or processing of images through image simulation, attribute information (processed information) may be restored to the state under the condition, based on which the simulation was performed, by entering the attribute information into the simulation again. By recording attribute information related to the construction of an image into the image created through simulation, respective pieces of configuration information related to the relevant image can be detected when a user enters the relevant image into the simulation again, with the result that new searching can be performed by easily modifying the relevant image.

Meanwhile, when attribute information is inserted into an image using the above meta tag method, it is preferred that the encoding unit 312 insert boundary information and link information into a specific area of the image. The format of each gathered image is analyzed, and boundary information and link information are modified or inserted using a standardized method (the EXIF, the IPTC format, or the XMP format) depending on the format of the image. When link information related to a specific site is inserted into a general image in a Joint Photograph Experts Group (JPEG) or Portable Network Graphics (PNG) file, there is an advantage in that a user can be linked to a relevant site, a product image or a detailed product information page by clicking on or selecting the specific area of the image, into which the link information has been inserted, using the user terminal 100.

Furthermore, when an image, the attribute information of which has already been encoded within an image file, is gathered, the decoding unit 313 decodes the encoded attribute information, stores the decoded attribute information in the attribute information database (DB) 321 and stores the image in an image storage DB 322.

Image decoding may be performed in such a way as to decode encrypted and compressed information, included in an image, by performing an image encoding process in reverse order. When the attribute information of an image is previously decoded and stored in the search DB 320, there is an advantage in that the speed of the driving of the search system according to the present embodiment is improved.

The above decoding method can be easily understood by a person having ordinary skill in the art. An example of the decoding method is as follows:

```
// when meta information is included in an image in the PHP environment, the relevant Meta information is extracted.
   include once 'ImageMeta.inc';
   $img=new ImageMeta( );
   $img→getMetaData($_FILES['image']['tmp_name']);
   if(isset($img→meta['Description']))
   ($imgMetaDescription=iconv('CP949',    'UTF-8',
$img→meta[Description']);}
```

In addition, when boundary information and link information are inserted into an image file, the decoding unit 313 decodes the boundary information and the link information and stores the decoded information in an attribute information DB 321.

Furthermore, the search DB 320 stores images gathered by the image gathering unit 310, and includes the attribute information DB 321 and the image storage DB 322.

Images are classified according to the type and stored in the image storage DB 322. The attribute information of the images is stored in the attribute information DB 321. It is preferred that images and attribute information, created through the above-described image simulation, be also stored in the attribute information DB 321, thereby expanding search object information.

In greater detail, clothes images are classified and stored according to the silhouette, pattern, color, brand, size, etc. The silhouettes are classified and stored according to the gender, coat or jacket, season, etc. The patterns are classified into patterns close to a plain pattern and other patterns. For the patterns close to a plain pattern, color values are stored, and, for other patterns, unique pattern names are stored.

The attribute information DB 321 stores the attribute information of images. The attribute information may be attribute information received by the attribute information reception unit 311, or attribute information decoded by the decoding unit 313.

Lastly, the information search unit 330 searches the search DB 320 for search information, including an image or attribute information, and includes a color extraction unit 331 and a dictionary creation unit 332 in order to index information.

When a search term entry is received from the user terminal 100, the information search unit 330 searches the search DB 320 for images relevant to a received search term and displays search results on the user terminal 100. Furthermore, the information search unit 330 may transmit a search term, received from the user terminal 100, to other search engines, such as Google®, Navar® or Yahoo®, and then display search results, including images found in other search engines, on the user terminal 100.

Here, it is preferred that image search results, received from the search DB 320 or other search engines, be displayed along with general information, such as websites, blogs, Internet cafes and/or professional data, which are relevant to the search term and displayed using the existing method.

When an image selection or an image combination is received from the user terminal 100, the information search unit 330 searches for relevant attribute information and displays search results on the user terminal 100.

When an image simulation is received from the user terminal 100, the information search unit 330 searches for relevant attribute information, and displays search results on the user terminal 100.

For example, when search results displayed by the information search unit 330 are related to clothes images, the information search unit 330 may recommend one or more products to a user for one or more of clothes images created through image simulation. The user can reduce time and effort by purchasing one or more of the recommended products.

When a click request related to a specific area of a displayed image is received from the user terminal 100, the information search unit 330 analyzes the coordinates of the specific area based on boundary information and link information, which are decoded by the decoding unit 313 and stored in the attribute information DB 321, and transmits information about a web page, relevant to the link information, to the user terminal 100.

The information search unit 330 includes the color extraction unit 331. The color extraction unit 331 extracts the color value of an image created or processed through image simulation.

The color value extraction process of the color extraction unit 331 is performed as follows:

First, when an image is close to a plain pattern (single color) image, a process of reducing the image in order to remove colors, other than a representative color, is performed and the image is then monochromated. This process is apparent to a person having ordinary skill in the art. An example of the process is as follows:

// create temporary reduced image (width, height)
$new=imageCreateTrueColor(20, 20);
// resample original image into reduced image size
imageCopyResampled($new, $src, 0, 0, 0, 0, imageSX ($src), imageSY($src), imageSX($new), Next, RGB values are extracted at one point on the image. An example of the PHP environment, including a graphics display (GD) library, is as follows:

// read color index (x coordinate, y coordinate)
$c=imagecolorat($src, $x, $y);
// convert color index into RGB
$c=imagecolorsforindex($src, $c);

Next, RGB values in a color picker are extracted.

In the case of a general graphic tool, a color picker is constructed, as shown in FIG. 4. Saturation and brightness on a portion A of FIG. 4 are obtained, hue on a portion B is obtained, and they are represented numerically.

In a color picker, saturation, brightness and hue values, obtained from selected portions, are converted into RGB using a conversion function. This process is apparent to those having ordinary skill in the art. An example of the conversion function in Java Script is as follows:

hsb2rgb: function(vHue, vSaturation, vBrightness)
var i, f, p, q, t, vReturn;
vHue=parseFloat(vHue/360);
vSaturation=parseFloat(vSaturation/100);
vBrightness=parseFloat(vBrightness/100);
if (vHue >=1.0) vHue %=1.0;
...
{ ... omitted return vReturn;}

Next, a color name is obtained from the RGB values.

A scale of 0 to 255 is reduced by dividing respective RGB values using an appropriate unit. All combinations of the reduced values are obtained, and a dictionary database is established. An example of a filtering function for establishing a dictionary database is as follows:

function getUnitColorCode($c)
...
if($c=='51')
{return '33';}
else if($c=='102')
{return '66';}
... if($c-51>102-$c)
{return '66';}
{ ... omitted {return 'cc';}}

The function performs a function of reducing the number of cases by grouping decimal R, G or B values, which are input to parameter $c, into a specific range and returning an optimal value. For example, when the R value is input as the decimal number 55, the function returns the hexadecimal digit 66. Even when the decimal number 57 is input, the function returns the hexadecimal number 66, and thus values near the value 66 can be all set to 66.

The function converts decimals values in the range from 0 to 255 into a total of six values, including 00, 33, 66, 99, CC and FF, and returns the resulting values. The function also reduces the number of cases, which can be obtained by combining RGB, from 16,777,216 to 216. The 215 cases are organized into a dictionary database, and names are assigned to respective colors. As a result, color names, such as 'red, yellow, and blue', relevant to input RGB values, are obtained, and the obtained color names are stored or processed in attribute information form and are then used as search terms.

Furthermore, the dictionary creation unit 332 creates a dictionary for the indexing of images created or processed through image simulation.

For example, in the case of a formal dress jacket, the index information of the formal dress jacket is stored based on search results from a number of shopping sites using the fact that the formal dress jacket is generally classified as a female jacket and the search term 'formal dress jacket'. In order to obtain more accurate results, it is preferred that search terms for all pattern classifications and color classifications be combined and index information using the combination results as the search terms be stored.

Examples of search term combinations and product indices are shown.

1. Example of Search Term Combination
ID search term
- - -
0001 formal dress jacket
0002 formal dress jacket+stripe pattern+stripe
0003 formal dress jacket+check pattern+lattice pattern
. . .
0101 formal dress jacket+red
0102 formal dress jacket+black
2. Example of Product Index
ID product name
- - -
0002 stripe pattern female formal dress jacket
0002 stripe formal dress jacket
. . .
0101 red color formal dress jacket For example, when a product search request based on image simulation for a formal dress jacket to which stripe patterns are mapped is received from the user terminal 100, the ID '0002' is searched for in an index dictionary created by the dictionary creation unit 332, and a product having the ID '0002' is searched for in the search DB 320 based on the ID '0002'.

In addition, it is preferred that, in the case in which in the information search unit 330 receives an image selection, an image combination or an image simulation from the user terminal 100 and provides image search results, the information search unit 330 also provide pattern information based on the determination of the subject area information or background area information of an image.

The determination of the subject area information or background area information of an image is described in detail below.

The information search unit 330 determines a subject area and a background area through the area-based analysis of an image using image data received from the user terminal 100. This determination is performed using a component labeling technique or a masking technique.

Using the two techniques, an image can be divided into a closed-space area and an open-space area. The sub-area of an area labeled an 'open-space area', which adjoins the outer boundary line of the entire image, is determined to be a background area and is then removed. Furthermore, space recognition is performed by removing discontinuous data from a closed-space area and a opened-space area, which are labeled using the masking technique.

The boundary line of an area extracted through space recognition is extracted using an edge extraction technique, such as the Sobel mask or Roberts mask technique. The boundary line is determined by connecting the pieces of discontinuous data of the extracted boundary line using a differential equation.

Scan extraction equations for the X and Y axes based on the Sobel mask are listed in the following Tables 1 and 2:

TABLE 1

| | | |
|---|---|---|
| −1 | 0 | 1 |
| −2 | 0 | 2 |
| −1 | 0 | 1 |

TABLE 2

| | | |
|---|---|---|
| 1 | 2 | 1 |
| 0 | 0 | 0 |
| −1 | −2 | −1 |

Scan extraction equation for the X and Y axes based on the Roberts mask are listed in the following Tables 3 and 4:

TABLE 3

| | |
|---|---|
| 0 | 1 |
| −1 | 0 |

TABLE 4

| | |
|---|---|
| 1 | 0 |
| 0 | −1 |

$$\frac{\partial x}{\partial y} = \frac{1}{6}$$

(X axis scan and neighboring pixel area) and $$\frac{\partial y}{\partial x} = \frac{1}{6}$$

(Y ax 6 axis scan and neighboring pixel area) are obtained from the above-described masks, and the following Equation 1 is derived from respective differential equations:

$$\nabla f = \sqrt{\frac{\partial f^2}{\partial x} + \frac{\partial f^2}{\partial y}} \quad (1)$$

Furthermore, boundary line data is determined using the above Equation 1 and the following Equation 2 related to an obtained angle:

$$\theta = \tan^{-1}\left(\frac{\frac{\partial f}{\partial x}}{\frac{\partial f}{\partial y}}\right) \quad (2)$$

When the boundary line data is determined, a certain pattern can be acquired along the boundary line. The pattern information of the acquired pattern is obtained by searching a pattern dictionary previously stored in the image storage DB 322. In this case, since a plurality of pieces of pattern information may be obtained from one image, information for which a user desires to search may be extracted through analogy. Furthermore, although, in a preferred embodiment of the present invention, a pattern dictionary has been described as being stored in the image storage DB 322, the present invention is not limited to the above embodiment.

After the pattern information has been obtained, color information is extracted by performing color recognition on the image from which the pattern information has been obtained.

This color recognition is performed on the image using the include a method of analyzing the main component of color within the closed-space area of a pattern and a method of organizing representative colors into a database and comparing the similarities of colors.

The method of analyzing the main component of color is performed as follows:

Assuming that ordered pairs of the unique values of the covariance E of the color values of X-axis pixels and the unique vectors of color position are (λ1, v1), (λ2, v2), . . . , (λk, vk) (the Y-axis variance of main components can be expressed by the following Equation 3:

$$Y - P' \cdot X = \begin{bmatrix} v'_1 \\ v'_2 \\ \ldots \\ v'_k \end{bmatrix} \cdot X = \begin{matrix} v_{11}X_1 + v_{12}X_2 + \ldots + v_{1k}X_k \\ v_{21}X_1 + v_{22}X_2 + \ldots + v_{2k}X_k \\ \ldots \\ v_{k1}X_1 + v_{k2}X_2 + \ldots + v_{kk}K_k \end{matrix} \quad (3)$$

After the main components are obtained using the above Equation 3 and the distribution of the obtained main components is obtained, the distribution of colors, such as that shown in FIG. 5, can be obtained. The distribution of colors generally exhibits an elliptical or circular form, as shown in FIG. 5. The center point of a dense elliptical or circular area is calculated using two approximated functions, a color value relevant to the center point is recognized as a main component color, and a relevant color value is extracted. Here, since the color values can be extracted from a number of closed-space areas, the color information of a relevant pattern can be analogized.

The method of comparing the similarities of colors is performed as follows:

Representative colors of generally used colors are previously organized into a database in representative color groups, such as 16 groups, 36 groups or 256 groups, and are then stored in the dictionary creation unit 332. Although, in a preferred embodiment of the present invention, the representative color groups have been described as being stored in the dictionary creation unit 332, the present invention is not limited to the above embodiment.

Color values existing in the closed-space area of a pattern are classified into the color values of relevant representative color groups. A color having the greatest number of color values of the relevant representative color group, as a result of the classification, is determined to be the color information of an image.

Meanwhile, the web server 400 is a physical space in which various data, constituting various websites, product sales sites (shopping malls), photo albums, or intellectuals over the information communication network 200, is stored. The data is transmitted to the user terminal 200 through a web browser or the like.

The web server 400 is defined as a concept comprehensively including not only web pages, transmitted to the user terminal 200, and various types of text information, exposed to web pages, but also storage in which all image files, music files and moving image files are stored.

A user can access various pieces of information existing in the web server 400 through a web browser in the user terminal 200. Furthermore, a user can upload and store various pieces of data, such as text, images, music, moving images and executable scripts, to and in the web server 400. As described above, all pieces of data, such as images or the like, which are registered by a user, are once stored in the web server 400 and then gathered by the search server 300. That is, in the case of images, the image gathering unit 310 of the search server 300 accesses a number of websites for providing images, stored in the web server 400, to the outside at regular intervals, and gathers and stores the images.

In the case in which a product image is registered, a user may create a product image close to an actual product and register the created product image by first creating a silhouette (the basic shape of the product), which is identical to the product, and then selecting a pattern or color. The registered product image is stored in the search server 300 or the web server 400, and the stored product image may be used for image simulation. That is, arbitrary users, including the user who has registered the product image, may select the registered product image provided through image simulation, check an image in which a cyber avatar wears the product image (for example, a clothes image) close to the actual product, and then purchase the product.

In the case in which general images are registered with the web server 400 through a number of websites or products are registered with shopping malls, e-marketplaces or the like, an additional encoding process is not required after the gathering of the images of the image gathering unit 310 if the attribute information of relevant images along with the images is included in an image meta information storage space and then encoded and resulting images are stored.

Preferably, encoding scripts, including web programs, may be contained in the web server 400. When a number of image registrants register images of products, the attribute information of the images can be set such that it is encoded using the embedded encoding scripts.

An image-based search method according to a preferred embodiment of the present invention is described below with reference to FIG. 6.

FIG. 6 is a flowchart showing the overall flow of the image-based search method according to the preferred embodiment of the present invention.

As shown in FIG. 6, search object images are first gathered at step S10.

Thereafter, whether the gathered search object images include attribute information is determined at step S20.

If, as a result of the determination at step S20, the images include attribute information, image decoding is performed at step S30.

The search object images and the attribute information are stored at step S40.

It is preferred that the attribute information, stored at step S40, be indexed in order to facilitate searching.

A search request is received, relevant searching is performed and search results are then output at step S50.

If, as a result of the determination at step S20, the images do not include the attribute information, whether HTML meta tags exist in the search object images is determined at step S60.

If, as a result of the determination at step S60, the HTML meta tags exist in the search object images, image encoding is performed at step S70, and the process returns to step S40.

If, as a result of the determination at step S60, the HTML meta tags do not exist in the search object images, only file names and site URLs are encoded at step S80 and the process returns to step S40.

According to the present invention, even when it is difficult to describe a search object using one or more words, an image, including various pieces of attribute information, can be selected, and thus there is an advantage in that a user can obtain accurate search results.

According to the present invention, there are advantages in that the efficiency of image management can be improved by encoding the attribute information of an image within the image and a user himself or herself can create an image, including various pieces of attribute information, through simulation capable of directly creating images.

According to the present invention, since attribute information related to an image configuration is recorded into a first image created through simulation, some other user can detect the recorded attribute information when performing simulation again using the relevant image, with the result that there is an advantage in that new information searching can be performed because a new image is created by easily reconfiguring or modifying the relevant image.

According to the present invention, there is an advantage in that, when found images are provided to a user, link information, pattern information or color information is also provided to the user, so that a user can acquire image-related information conveniently.

According to the present invention, there are advantages in that a user can simply search for desired products based on accurate image search results and also compare the prices of the products conveniently.

Although the preferred embodiments of the present invention have been disclosed-for illustrative purposes, those skilled in the art will appreciate that various modifications, additions and substitutions are possible, without departing from the scope and spirit of the invention as disclosed-in the accompanying claims.

What is claimed is:

1. An image-based search system, comprising:
at least one user terminal configured to transmit any one or more of a search term entry, an image selection and an image combination to a search server and receiving relevant search results from the search server;
an information communication network for connecting the user terminal, the search server and a web server to one another;
the search server configured to determine whether gathered search object images include attribute information, and as a result
decode the image when the gathered search object images includes the attribute information, then store the search object images and the attribute information and search in conformity with a search request, and then output search results,
determine whether a HyperText Markup Language (HTML) meta tag exists in the search object images when the search object images do not include the attribute information,
encode the image when the HTML meta tag exists in the search object images, then store the search object images and the attribute information, and search in conformity with a search request, and then output search results, and
perform image file name encoding when the HTML meta tag does not exist in the search object images then store the search object images and the attribute information, and search in conformity with a search request, and then output search results; and
the web server for forming a physical space over the information communication network, in which websites, which are objects from which information is gathered by the search server, exist.

2. The image-based search system as set forth in claim 1, wherein the user terminal is any one of a personal computer, a Personal Digital Assistant (PDA) and a mobile phone.

3. The image-based search system as set forth in claim 1, wherein the user terminal includes a function of displaying attribute information of a selected or combined image and a function of modifying or adding attribute information.

4. The image-based search system as set forth in claim 1, wherein the search server includes a function of performing searching based on image simulation when the search server or the web server receives an image simulation, requesting searching using attribute information of an image, which is obtained through the image simulation, the image being directly created, assembled or processed by a user through the image simulation, the image simulation being provided to the user terminal through the search server or the web server.

5. The image-based search system as set forth in claim 4, wherein the search server includes a function of displaying a multi-recommendation to the user terminal with respect to one or more of clothes images based on the image simulation when the image simulation is related to a clothes image.

6. The image-based search system as set forth in claim 4, wherein the search server or the web server includes a function of encoding attribute information, including processed information, in the image, obtained from the image simulation, using an encoding function included in the image simulation itself.

7. The image-based search system as set forth in claim 4, wherein the search server or the web server includes a function of recording the attribute information of the image into the image obtained from the image simulation, and, when the image is used in image simulation again, displaying processed information in the image simulation on the user terminal again based on the recorded attribute information.

8. The image-based search system as set forth in claim 1, wherein the search server includes a function of, when a found image is an image of a product, providing price comparison information of the product in search results.

9. The image-based search system as set forth in claim 1, wherein the search server includes a function of transmitting a received search term to an additional search engine, receiving search results, including images found by the search engine, and providing the search results to the user terminal.

10. The image-based search system as set forth in claim 1, wherein the web server includes a function of receiving an image, registered by an image registrant, in order to provide the image to the search server, and encoding and storing attribute information of the image in the registered image.

11. The image-based search system as set forth in claim 1, wherein the search server comprises:
an image gathering unit for accessing a number of websites, providing images, at regular intervals and gathering images from the web server;
a search DataBase (DB) for storing search information, including the images gathered by the image gathering unit; and
an information search unit for searching the search DB for search information, including the images, and displaying the search results on the user terminal.

12. The image-based search system as set forth in claim 11, wherein the image gathering unit comprises:
an attribute information reception unit for receiving attribute information of the gathered images;
an encoding unit for encoding the received attribute information of the images in image files; and
a decoding unit for decoding the encoded attribute information.

13. The image-based search system as set forth in claim 12, wherein, when a received image is an image of a product registered with an on-line shopping mall, the attribute information encoded by the encoding unit includes any one or more of a product name and a keyword of the product.

14. The image-based search system as set forth in claim 12, wherein, when a received image is a still image of a moving image, the attribute information encoded by the encoding unit includes any one or more of a moving image title and a keyword of the moving image.

15. The image-based search system as set forth in claim 12, wherein the attribute information encoded by the encoding unit includes link information of a website from which an image is received.

16. The image-based search system as set forth in claim 12, wherein, when the encoded image is an image obtained through image simulation, the encoding unit includes a function of encoding attribute information including processed information.

17. The image-based search system as set forth in claim 16, wherein the encoding unit includes a function of assigning a unique identification (ID) to each piece of processed information.

18. The image-based search system as set forth in claim 12, wherein the encoding unit includes a function of inserting an encoding into an image file so that whether to perform encoding can be determined.

19. The image-based search system as set forth in claim 11, wherein the information search unit comprises a dictionary creation unit for creating a dictionary for indexing.

20. The image-based search system as set forth in claim 11, wherein the information search unit includes a function of providing pattern information specified based on determination of subject area information or background area information of an image.

21. The image-based search system as set forth in claim 20, wherein the information search unit further includes a function of providing color information of an image.

22. An image-based search method, comprising:
(a) gathering, by a search server, search object images;
(b) determining, by the search server, whether the gathered search object images include attribute information;
(c) if, as a result of the determination at the (b), the gathered search object images include the attribute information, performing image decoding, (d) storing, by the search server, the search object images and the attribute information, and (e) searching in conformity with a search request, and then outputting search results,
wherein:
(c-1) if, as a result of the determination at the (b), the search object images do not include the attribute information, determining whether a HyperText Markup Language (HTML) meta tag exists in the search object images,
(c-2) if, as a result of the determination at the (c-1), the HTML meta tag exists in the search object images, performing image encoding and returning to the (d), and
(c-3) if, as a result of the determination at the (c-1), the HTML meta tag does not exist in the search object images, performing image file name encoding and returning to the (d).

23. The image-based search method as set forth in claim 22, wherein the (d) comprises (d-1) indexing the attribute information in order to facilitate searching.

* * * * *